US009455982B2

(12) United States Patent
Smith

(10) Patent No.: US 9,455,982 B2
(45) Date of Patent: Sep. 27, 2016

(54) IDENTIFICATION AUTHENTICATION IN A COMMUNICATIONS NETWORK

(76) Inventor: Steve Smith, Fullerton, CA (US)

( * ) Notice: Subject to any disclaimer, the term of this patent is extended or adjusted under 35 U.S.C. 154(b) by 229 days.

(21) Appl. No.: 13/475,903

(22) Filed: May 18, 2012

(65) Prior Publication Data

US 2012/0293304 A1    Nov. 22, 2012

Related U.S. Application Data

(60) Provisional application No. 61/488,153, filed on May 20, 2011.

(51) Int. Cl.
| | |
|---|---|
| *G06F 7/04* | (2006.01) |
| *H04L 29/06* | (2006.01) |
| *H04W 12/06* | (2009.01) |

(52) U.S. Cl.
CPC .......... *H04L 63/0861* (2013.01); *H04W 12/06* (2013.01)

(58) Field of Classification Search
CPC .... H04W 12/06; H04L 63/205; H04L 63/08; H04L 63/102; H04L 63/0861; G06F 21/31; G06F 21/32; G06F 21/34; G06F 21/46
USPC ........... 340/5.8, 5.81, 5.82, 5.83, 5.84, 5.85, 340/5.52, 5.53, 5.54; 455/415
See application file for complete search history.

(56) References Cited

U.S. PATENT DOCUMENTS

| | | | | |
|---|---|---|---|---|
| 2003/0115142 | A1* | 6/2003 | Brickell et al. | 705/51 |
| 2003/0128099 | A1* | 7/2003 | Cockerham | 340/5.7 |
| 2005/0268107 | A1* | 12/2005 | Harris et al. | 713/182 |
| 2006/0282395 | A1* | 12/2006 | Leibowitz | G06F 21/32 705/67 |
| 2006/0286969 | A1* | 12/2006 | Talmor et al. | 455/415 |
| 2009/0116703 | A1* | 5/2009 | Schultz | 382/118 |
| 2009/0143046 | A1* | 6/2009 | Smith | H04W 76/007 455/404.1 |
| 2009/0206992 | A1* | 8/2009 | Giobbi et al. | 340/5.74 |
| 2009/0281904 | A1* | 11/2009 | Pharris | 705/17 |
| 2011/0176667 | A1* | 7/2011 | Kumar | 379/142.04 |
| 2012/0090038 | A1* | 4/2012 | Pacella et al. | 726/30 |

* cited by examiner

*Primary Examiner* — Nabil Syed

(57) ABSTRACT

Systems and methods for an identification capable communication device are provided. The communication device or line is registered or associated with a primary unique ID that identifies a person. Furthermore, the unique ID is associated with a secondary unique ID (e.g., biometric information of that person, or a unique identification code only known by that person). The combination of the primary and the secondary IDs is registered with a server system that is capable of verifying the two IDs when a communication connection is initiated from the registered communication device or line.

16 Claims, 4 Drawing Sheets

IDENTIFICATION AUTHENTICATION IN A COMMUNICATIONS NETWORK

CROSS-REFERENCE TO RELATED APPLICATIONS

Pursuant to 35 U.S.C. 119, the present application claims priority to and incorporates by reference the entire content of U.S. Provisional Application Ser. No. 61/488,153 filed on May 20, 2011.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to authenticating the identity of a party engaged in communication over a communications network.

BACKGROUND

Currently there are few identification schemes available that can securely verify the identity of parties communicating over a communications network. For example, caller identification services are available through the phone company which identify a calling party on the receiving end, by way of providing the name of the calling party on a caller ID screen. This caller ID information, however, is associated with the phone line from which the call is made and not necessarily with the person who is making the phone call. In other words, if a first party initiates a call to a second party from a phone line registered to a third party, the second party will not be able to verify the identity of the first party based on the caller ID information of the third party.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one or more embodiments, an identification capable communication device is provided. The communication device is registered or associated with a primary unique ID that identifies a person. Furthermore, the unique ID is associated with a secondary unique ID (e.g., biometric information of that person, or a unique identification code only known by that person). The combination of the primary and the secondary IDs is registered with a server system that is capable of verifying the two IDs when a communication connection is initiated from the registered communication device or communication line.

When initiating a call, the primary ID is automatically provided to a server system configured for authenticating the identification of the caller. The caller is then requested to provide the secondary unique ID by way of providing the respective unique code. The unique identification code may be directly entered onto the phone pad or provided by way of a retina scanner, a fingerprint reader, or other type of biometric data collection mechanism.

The secondary ID information, in addition to the primary ID information are provided to the server. If the two IDs match, then the server can authenticate the identity of the caller and provide the relevant identity information previously stored on the server to the party receiving the call.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
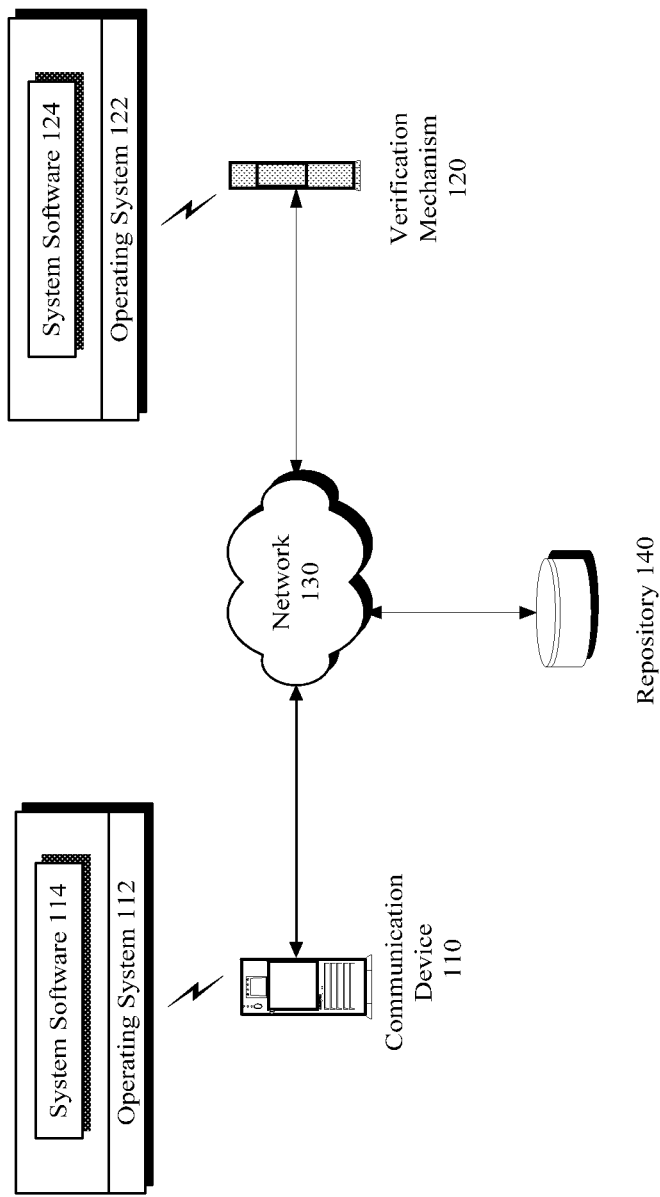
FIG. 1 is a block diagram of an operating environment in which a communication device communicates with a verification mechanism over a network, in accordance with one embodiment.

Referring to FIG. 1, in accordance with one or more embodiments, an identification capable communication device 110 is provided. The communication device 110 may have an operating system 112 and system software 114 that enables the communication device 110 to communicate, over a network 130, with a verification mechanism 120. Verification mechanism 120 may be implemented on a remote server and may utilize an operating system 122 and system software 124 to receive authentication requests from communication device 110.

Communication device 110, a SIM card used in the communication device 110, or a phone number or phone line associated with the communication device 110 may be registered or associated with a primary unique ID that is assigned to or identifies a person, so that when a communication connection is established between the communication device 110 and a verification mechanism 120 on a remote server, for example, the primary unique ID may be retrieved. The unique ID may be stored in a repository 140 or alternatively, the primary unique ID may be stored in the communication device 110 directly and communicated to the verification mechanism 120.

In one embodiment, the primary unique ID is associated with a secondary unique ID (e.g., biometric information of that person, or a unique identification code only known by that person). The combination of the primary and the secondary IDs is registered with verification mechanism 120 that is capable of verifying the two IDs when a communication connection is initiated from a registered communication device 110 or line. If the records stored in the repository 140, for example, indicate a match between the two IDs, then the identity of the caller is verified or authenticated.

Figure 2:
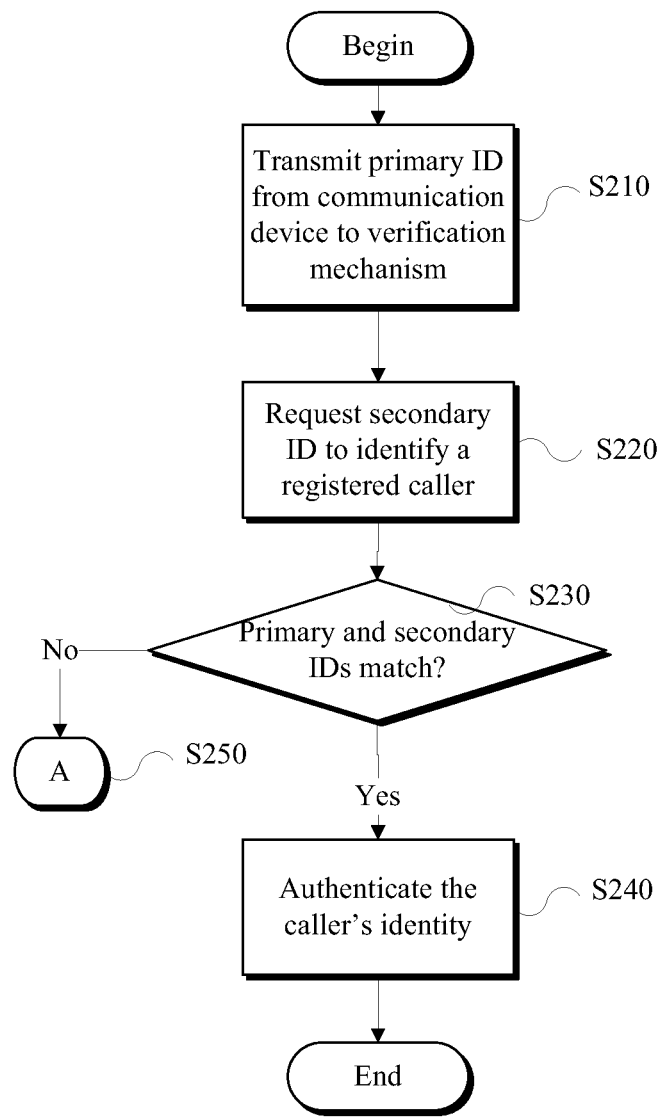
FIG. 2 is a flow diagram of a method of verifying the identity of a caller using an ID enabled communication device, in accordance with one embodiment.

Referring to FIG. 2, in one implementation, when initiating a call, the primary ID is automatically transmitted to the verification mechanism 120 from the communication device 110 (S210). The caller may be requested to provide the secondary unique ID by way of providing a secondary ID or data that uniquely identifies the registered caller (S220). The secondary ID may be directly entered onto the phone pad or provided by way of a retina scanner, a fingerprint reader, or other type of biometric data collection mechanism.

Accordingly, the secondary ID information, in addition to the primary ID information, is provided to the verification mechanism 120. If the primary and secondary IDs match (S230), then the verification mechanism 120 successfully authenticates the identity of the caller and provides the relevant identity information to the party receiving the call (S240). Otherwise, the authentication fails and is handled by way of, for example, requesting the caller to try again or terminating the connection (S250).

In accordance with some embodiments, an ID capable communication device 110 may be a landline phone, a cell phone or other type of mobile terminal such as a tablet or laptop configured for transmitting the noted identification information to a verification mechanism 120. Depending on implementation, the secondary ID may include any type of data that uniquely identifies the caller, such as social security number, driver's license number, a physician's license number, a physician's drug enforcement agency (DEA) number, biometric data, or the like. This information may be certified by way of a recognized authority or mechanisms and registered in a secure server after the information has been properly vetted.

The registration or vetting process may take place by way of a onetime interaction with a representative that verifies the accuracy and legitimacy of the information (e.g., by identifying the person via some legal identification means either in person based on governmentally issued IDs, such as a driver license, social security card or passport, or by other identification processing instruments commonly used to identify a person).

In one embodiment, for each profession, a standardized identification template may be implemented that indicates the type of identification data that are to be provided or collected in order to properly identify an individual based on a call initiated by a communication device 110 registered to him. For example, in the case of a doctor who needs to write a prescription, the template may require the verification of the ID information based on the presentation of a photo ID and a state driver's license. The doctor's physician's license number and the doctors DEA number may be also used either separately or in combination with the above as means of uniquely identifying the doctor.

In one implementation, a proper registration will result in the unique ID and the related authentication information for the person using the communication device to be stored in the secure server. The secure server may reside at a telephone company or may be attached to a network accessible by the communication company involved in routing a call initiated with a registered communication device. To initiate a communication (e.g., a phone call), the person will enter the destination contact information (e.g., telephone number, fax number, email address, etc.) to the communication device. The initiation of the communication results in the primary ID data (e.g., the ID of the communication device, or the phone line from which the call is made) to be sent to the server.

Before or after the connection is established, the person may provide voluntarily, or in response to a prompt, the secondary ID information by way of the keypad on the calling device. For example, a doctor writing a prescription may be prompted to enter her driver license number or DEA number. Alternatively, if biometric information is to be provided, the doctor may provide that information by way of a retina or fingerprint scan, for example. If there is a match between the primary ID and the secondary ID, then the server authenticates the caller and provides the identifying information to the receiving party.

In one embodiment, the above authentication scheme may be utilized by a doctor to send a prescription to a pharmacy, instead of having to call the pharmacy over the phone or write a prescription on a prescription pad. The prescription may thus be generated in the form of an email, a log or a fax that is transmitted to the pharmacy or stored in a location where a pharmacist may access it (e.g., by logging into a secure platform). When the pharmacy has the prescription, the pharmacists will look for the time and date stamp plus a unique code or watermark that is, for example, randomly assigned to each prescription. The server may generate this code or watermark as a means of providing additional authentication insignia.

Optionally, when the pharmacist is ready to fill the prescription, he or she will log on and enter a code to retrieve the prescription. If this prescription was legitimately sent, the numbers entered will match those on the server and the order will be filled. Each time the doctor sends a prescription, a new time and date stamp, as well as a new prescription number may be generated. As such, if information was entered incorrectly or if someone tries to fake a prescription, the pharmacist will get a void or unauthorized notice and the order will not be filled.

In another embodiment, the above authentication scheme may be used by a law enforcement agency to determine the true identity of a person. For example, the target person may be asked to dial a number or use Bluetooth connectivity of his mobile phone to establish a communication connection with a law enforcement agency's verification device. The target person may be then asked to enter his biometric information to the phone. If the phone has been already registered, then the provided information may be used by the server with which the communication connection is established to identify the target person in a similar manner as disclosed earlier.

In one exemplary implementation, the receiving party (e.g., the pharmacy or the law enforcement personnel) will be able to further verify the identity of the caller or a target person based on an image or photo of the caller or the target person. In such an implementation, at the time of registration, a photograph of the person is taken and added to the person's profile information stored in a central database (e.g., repository 140) that can be accessed at the time the identification is being made. For example, in the case of a law enforcement personnel, the target person may utilize a mobile phone to communicate the identification information stored on the phone with the law enforcement's verification device. The verification device, in turn, communicates the identification information to a server system which verifies the authenticity of the information by matching the provided identification information with the data that has been stored in a registration database, for example, at the time of registration.

If the identification information is successfully authenticated by the server, then the server communicates a success notification back to the law enforcement agency's verification device. The success notification may in part also include a photo of the target person that was taken at the time of registration. Inclusion of the photo in the success notification may enhance the law enforcement personnel's ability to better identify the target person. In addition to the photo, and depending on implementation, other data may be also included with the success notification. For example, if the target person is a licensed person (e.g., a doctor, a police officer, an attorney, a real estate broker, etc.) then related license information may be also displayed, which would enhance the target person's ability to get through certain check points, for example, or make it possible for the target person to obtain certain information that would not otherwise be available to an unlicensed person.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
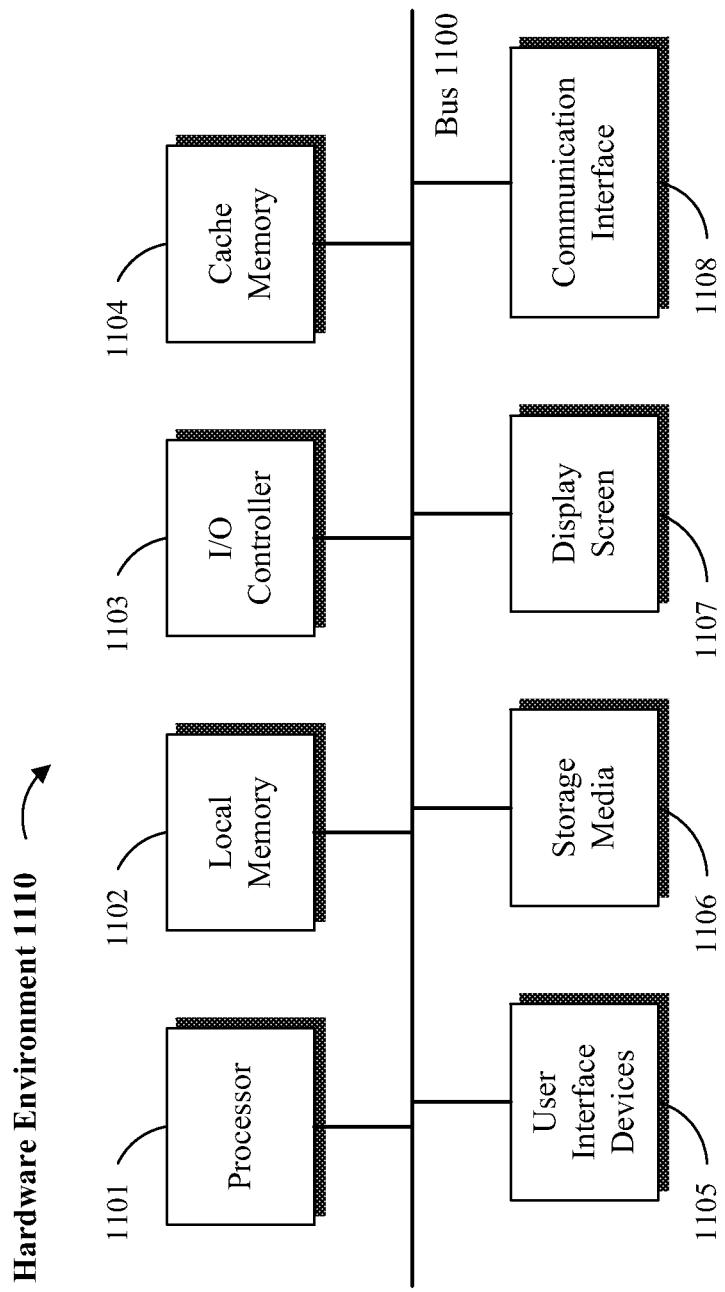
FIGS. 3A and 3B are block diagrams of hardware and software environments in which the disclosed systems and methods may operate, in accordance with one or more embodiments.
Figure 3B:
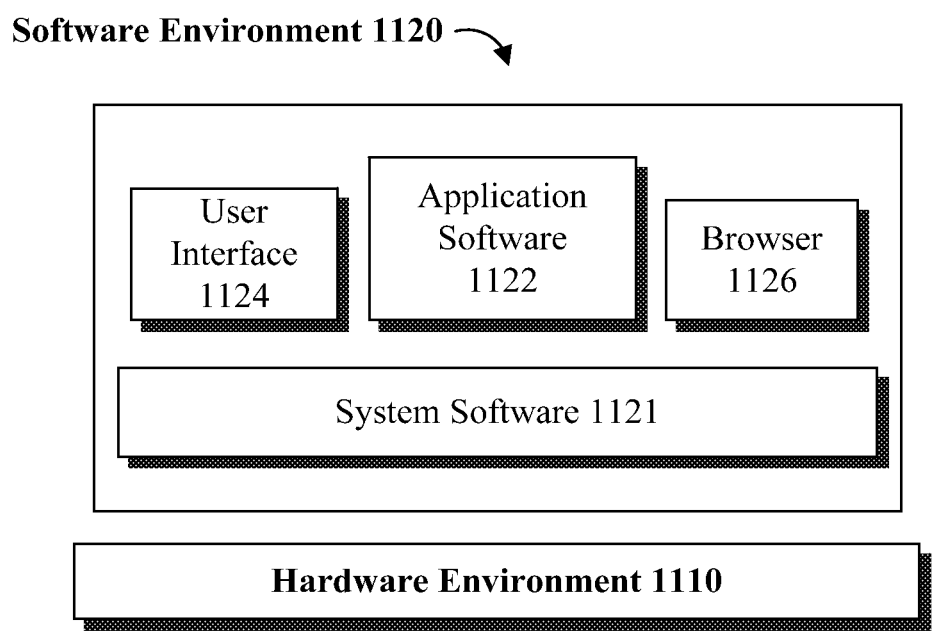

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

The invention claimed is:

1. An identification method using a mobile communication device having a first unique identifier, the method comprising:
   registering the mobile communication to a single user as an identification device in a onetime interaction with a representative of a recognized authority, wherein registering the mobile communication device to the single user includes:
      assigning the first unique identifier of the mobile communication device to the single user, wherein the first unique identifier uniquely identifies the single user to whom the mobile communication device is registered,
      associating a second unique identifier to the first unique identifier, the second unique identifier including biometric data of the single user,
      verifying the accuracy and legitimacy of the associated first unique identifier, the second unique identifier, and the single user's identity by the representative using legally recognized identification information,
      certifying the associated first unique identifier and the second unique identifier by the recognized authority, and
      storing a photo of the single user, the certified first unique identifier, and the certified second unique identifier on a remote secure server that includes a verification mechanism, wherein the remote secure server and verification mechanism are configured to verify identities of persons;
   establishing a communication connection to the remote secure server with the identification device by a caller;
   automatically transmitting the first unique identifier from the identification device to the remote secure server for processing by the verification mechanism;
   receiving a request from the remote secure server to input a secondary ID based upon biometric data of the caller;
   inputting the secondary ID into the identification device by the caller;
   transmitting the secondary ID from the identification device to the remote secure server for processing by the verification mechanism, wherein upon receipt of the first unique identifier and the secondary ID, the verification mechanism compares the first unique identifier and the secondary ID to the certified first unique identifier and the certified second unique identifier; and
   transmitting authentication information and the photo of the single user from the remote secure server confirming that the caller and the single user are the same individual if the first unique identifier and the secondary ID match the certified first unique identifier and the certified second unique identifier.

2. The method of claim 1 wherein the legally recognized identification information includes a governmentally issued ID.

3. The method of claim 1 wherein the photo is transmitted to a third party device.

4. The method of claim 1 wherein the biometric data comprises finger print information.

5. The method of claim 1 wherein the biometric data comprises retina scan information.

6. The method of claim 1 wherein the authentication information is provided to an enforcement authority.

7. The method of claim 6 wherein the authentication information includes information verifying that the single user to whom the mobile communication device is registered has a valid legally recognized license to practice a certain profession.

8. The method of claim 6 wherein the enforcement authority is a police officer.

9. An identification method using a mobile communication device having a first unique identifier, the method comprising:
   registering the mobile communication device to a single user as an identification device in a onetime interaction with a representative of a recognized authority, wherein registering the mobile communication device to the single user includes:
      assigning the first unique identifier of the mobile communication device to the single user,
      associating a second unique identifier to the first unique identifier, the second unique identifier including biometric data of the single user,
      verifying the accuracy and legitimacy of the associated first unique identifier, the second unique identifier, and the single user's identity by the representative using legally recognized identification information,
      certifying the associated first unique identifier and the second unique identifier by the recognized authority, and
      storing a photo of the single user, the certified first unique identifier, and the certified second unique identifier on a remote secure server that includes a verification mechanism, wherein the remote secure server and verification mechanism are configured to verify the identity of a person;

establishing a communication connection between the identification device and a third party verification device by a caller;

automatically transmitting the first unique identifier from the identification device to the third party verification device;

inputting the secondary ID into the identification device by the caller;

transmitting the secondary ID from the identification device to the third party verification device;

transmitting the first unique identifier and the secondary ID to the remote secure server from the third party verification device upon receipt of the first unique identifier and the secondary ID by the third party verification device, wherein upon receipt of the first unique identifier and the secondary ID by the remote secure server, the verification mechanism compares the first unique identifier and the secondary ID to the certified first unique identifier and the certified second unique identifier; and transmitting authentication information and the photo of the single user from the remote secure server to the third party verification device confirming that the caller and the single user are the same individual if the first unique identifier and the secondary ID match the certified first unique identifier and the certified second unique identifier.

10. The method of claim 9 further comprising receiving a request from the third party verification device to input a secondary ID based upon biometric data of the caller.

11. The method of claim 9 wherein the biometric data comprises finger print information.

12. The method of claim 9 wherein the biometric data comprises retina scan information.

13. The method of claim 9 wherein the authentication information is provided to an enforcement authority.

14. The method of claim 13 wherein the authentication information includes information verifying that the single user to whom the mobile communication device is registered has a valid legally recognized license to practice a certain profession.

15. The method of claim 13 wherein the enforcement authority is a police officer.

16. The method of claim 9 wherein the legally recognized identification information includes a governmentally issued ID.

* * * * *